United States Patent
Moutousis et al.

(12)
(10) Patent No.: US 6,719,513 B1
(45) Date of Patent: Apr. 13, 2004

(54) REVERSE BOW RETENTION PUSH PIN

(75) Inventors: Phillip Moutousis, Sterling Height, MI (US); Wayne Edward Bahr, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/664,892

(22) Filed: Sep. 19, 2000

(51) Int. Cl.[7] .................................................. F16B 19/00
(52) U.S. Cl. ......................................................... 411/510
(58) Field of Search ................................. 411/508, 509, 411/510

(56) References Cited

U.S. PATENT DOCUMENTS

| | | | | |
|---|---|---|---|---|
| 3,309,955 A | * | 3/1967 | Turnbull | 411/508 |
| 3,481,242 A | | 12/1969 | Topf | |
| 3,764,729 A | * | 10/1973 | Kowalewski | 411/508 |
| 4,392,278 A | | 7/1983 | Mugglestone | |
| 4,402,641 A | | 9/1983 | Arff | |
| 4,427,328 A | * | 1/1984 | Kojima | 411/410 |
| 4,635,326 A | * | 1/1987 | Yagi | 411/508 |
| 4,681,288 A | * | 7/1987 | Nakamura | 411/508 |
| 4,776,739 A | * | 10/1988 | Hamman | |
| 4,826,379 A | | 5/1989 | Norden | |
| 5,306,098 A | * | 4/1994 | Lewis | |
| 5,368,261 A | * | 11/1994 | Caveney | 411/510 |
| 5,393,185 A | | 2/1995 | Duffy | |
| 5,813,810 A | | 9/1998 | Izume | |
| 5,907,891 A | | 6/1999 | Meyer | |

* cited by examiner

*Primary Examiner*—Flemming Saether
(74) *Attorney, Agent, or Firm*—Raymond L. Coppiellie

(57) ABSTRACT

A reverse bow retention push pin includes a head portion, a shank portion extending a predetermined distance from the head portion, a plurality of fins disposed along the shank portion, and a bow member disposed on the shank a predetermined distance between the head portion and the plurality of fins.

10 Claims, 2 Drawing Sheets

REVERSE BOW RETENTION PUSH PIN

FIELD OF THE INVENTION

The present invention relates to fasteners, and more specifically, to a reverse bow retention push pin fastener.

BACKGROUND OF THE INVENTION

Push pin fasteners are typically used to secure two members together, such as panels or the like, and include a head and a shank. Conventional push pin fasteners serve a retaining function, but do not create tension or pressure between the members or panels. One type of push pin fastener includes one or more sets of spaced fins formed along the length of the shank, which then become flexed and engaged upon insertion within a pair of aligned panel apertures, thereby preventing the fastener from being extracted and the panels from separating. However, over time these types of fasteners weaken and lose the ability to securely hold the panels together.

Therefore, it is beneficial to have a push pin fastener that incorporates a feature which prevents the push pin from loosening over time as well as creates tension or pressure between panel members.

SUMMARY OF THE INVENTION

It is an object of the present invention to provide a reverse bow retention push pin that overcomes the disadvantages of the prior art.

The present invention advantageously provides a reverse bow retention push pin including a head portion, a shank portion extending a predetermined distance from the head portion, a plurality of fins disposed along the shank portion, and a bow shaped member a predetermined distance between the head portion and the plurality of fins.

It is a feature of the present invention that the reverse bow has flexible distal ends which, upon full insertion, are flexed toward the head thereby creating tension.

BRIEF DESCRIPTION OF THE DRAWINGS

These and other objects, features, and advantages of the present invention will become apparent from a reading of the following detailed description with reference to the accompanying drawings, in which.

DESCRIPTION OF THE PREFERRED EMBODIMENT(S)

Figure 1:
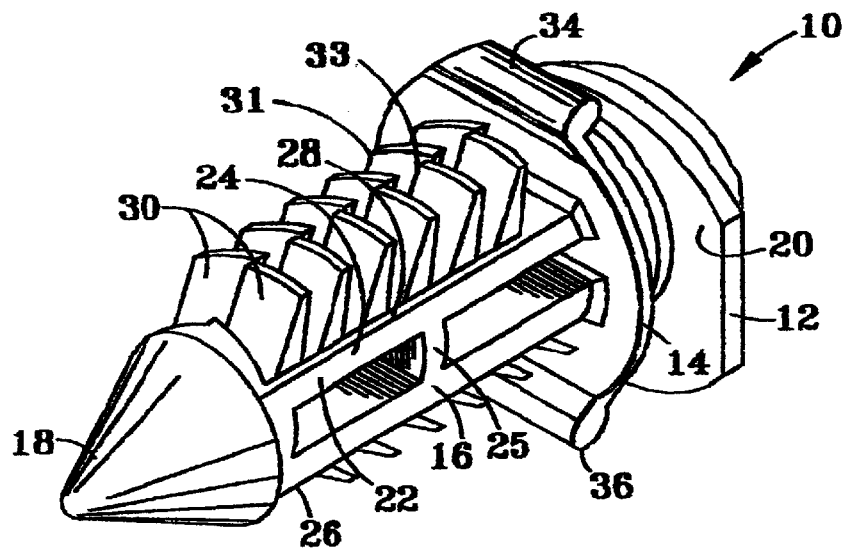
FIG. 1 is a perspective view of the reverse bow retention push pin according to the present invention.
Figure 2:
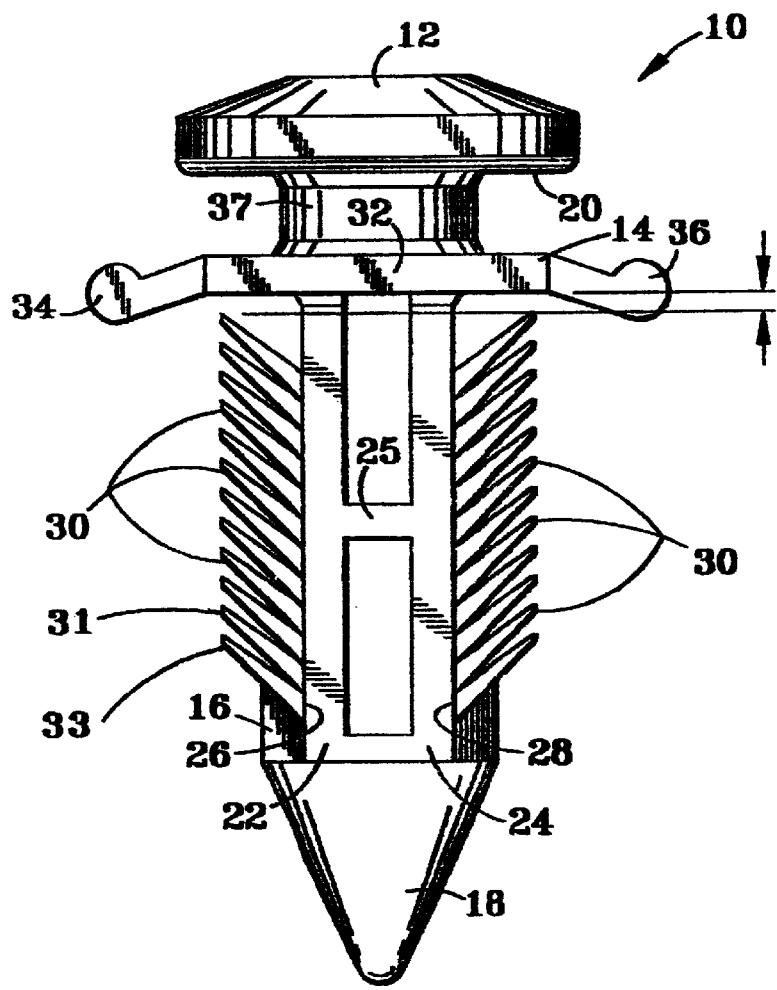
FIG. 2 is a front view of the reverse bow retention push pin according to the present invention.
Figure 3:
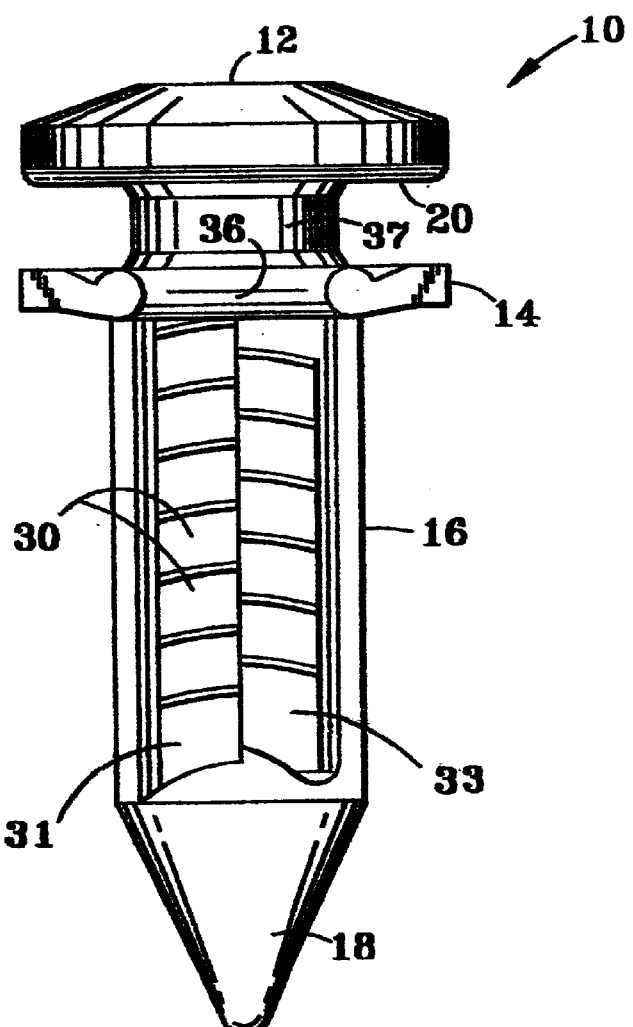
FIG. 3 is a side view of the reverse bow retention push pin according to the present invention.

Referring to FIGS. 1–3, a reverse bow retention push pin 10 is illustrated. The push pin 10 can be used to connect two members, such as panels (not shown), through apertures formed therethrough and is formed from a polymeric material, preferably polypropylene.

As illustrated, the push pin 10 has a head 12, a reverse bow member 14, a shank 16, and a conical lead portion 18. The head 12 is substantially circular and convex in shape, having a planar underside 20.

The shank 16 projects perpendicularly from the underside 20 of the head 12 and is generally H-shaped in cross section. The shank 16 is formed by opposed lateral sides 22 and 24 and a horizontal cross member 25. The lateral sides 22 and 24 each have exterior walls 26 and 28 respectively. The shank 16 extends a predetermined distance from the underside 20 of the head 12.

The shank 16 includes a predetermined number of substantially rectangular shaped flat flexible fins 30 spaced a predetermined distance apart, which extend from the exterior walls 26 and 28 of the lateral sides 22 and 24 at a predetermined upward angle towards the head 12. Upon placement of the reverse bow retention push pin 10 into an aperture, the conical lead portion 18 and the shank 16 are inserted, during which the fins 30 flex toward the head 12 and then engage the back side of the bottom member to connect the members together.

Figure 4:
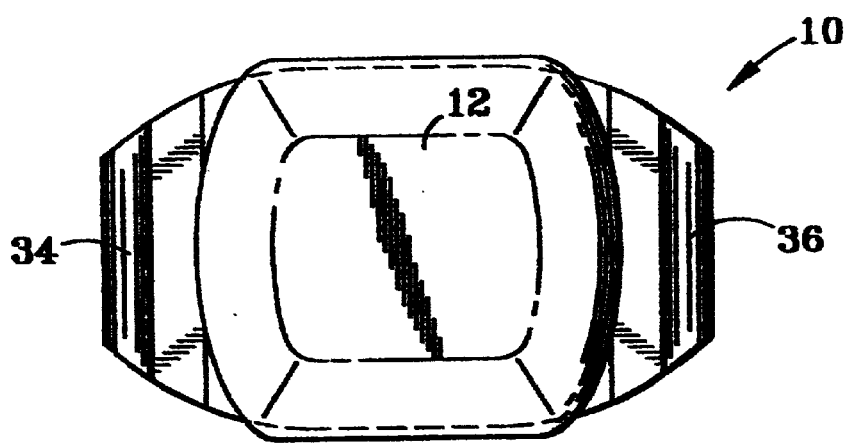
FIG. 4 is a top view of the reverse bow retention push pin according to the present invention.

As shown in FIG. 4, the reverse bow member 14 is substantially oval shaped and is disposed a predetermined distance between the underside 20 of the head 12 and the fins 30 of the shank 16 creating a neck portion 37. The reverse bow member 14 has a centermost portion 32 that is substantially flat and parallel with the underside 20 of the head 12. From the centermost portion 32, the bow member 14 projects outward and arches downward terminating in right and left distal ends 34 and 36. The right and left ends 34 and 36 of the reverse bow member 14 arch away from the head portion a predetermined distance greater than the centermost portion 32.

In using the reverse bow retention push pin 10, the conical lead portion 18 and the shank 16 are inserted into an aperture until the right and left ends 34 and 36 of the reverse bow 14 meet with the member. At this point, the push pin 10 is inserted further into the aperture until the centermost portion 32 of the reverse bow 14 is flush with the member, thus resulting in the right and left ends 34 and 36 of the reverse bow member 14 to be fully flexed towards the head 12. The fins 30 then become flexed outwards advantageously creating tension between mating panels. This tension reduces loosening and rattling of the push pin 10 over time, and maintains the retention properties of the push pin 10 without increasing insertion efforts.

While only one embodiment of the reverse bow retention push pin of the present invention has been described, others may be possible without departing from the scope of the following claims.

What is claimed is:

1. A push pin comprising:
   a head portion;
   a shank portion extending a predetermined distance having a pair of opposing generally planar spaced regions thereabout and having a longitudinal axis with a terminal end opposite the head portion;
   two spaced apart rows of fins formed on each of said generally planar regions, each row oriented in an axial direction parallel to the longitudinal axis of said shank portion, each of said rows of fins disposed so as to form gaps between vertically adjacent fins such that a first fin in a first row intersects the shank in a plane different than each fin of a second row such that the fins in the first row project in a direction normal to the axis to be entirely within said gaps created by the fins in the second row;
   a bow member disposed on the shank a predetermined distance between the head portion and the fins; and
   wherein the regions circumferentially alternate between a region of rows of fins and an exposed shank region.

2. The push pin as claimed in claim 1, wherein the shank portion is H-shaped in cross section.

3. The push pin as claimed in claim 1, wherein each of the rows of flexible fins are angled toward the head portion an equal predetermined degree.

4. The push pin as claimed in claim 1, wherein the bow member has a centermost portion and opposed distal ends.

5. The push pin as claimed in claim 4, wherein the centermost portion is a predetermined distance from the head portion and the distal ends arch a predetermined distance greater than the centermost portion away from the head portion.

6. A push pin comprising:

a head portion;

a shank portion extending a predetermined distance having a pair of opposing generally planar spaced regions thereabout and having a longitudinal axis with a terminal end opposite the head portion;

two spaced apart rows of fins formed on each of said generally planar regions, each row oriented in an axial direction parallel to the longitudinal axis of said shank portion, each of said rows of fins disposed so as to form gaps between vertically adjacent fins such that a first fin in a first row intersects the shank in a plane different than each fin of a second row such that the fins in the first row project in a direction normal to the axis to be entirely within said gaps created by the fins in the second row;

a bow member disposed on the shank a predetermined distance between the head portion and the fins having a centermost portion and flexible distal ends that arch away from the head portion a predetermined distance greater than the centermost portion; and wherein the regions circumferentially alternate between a regions of rows of fins and an exposed shank region.

7. The push pin as claimed in claim 6, wherein the shank is H-shaped in cross section.

8. The push pin as claimed in claim 6, wherein each of the rows of flexible fins are angled toward the head portion an equal predetermined degree.

9. A push pin comprising:

a head portion;

a shank portion extending a predetermined distance having a pair of opposing generally planar spaced regions thereabout and having a longitudinal axis with a terminal end opposite the head portion;

two spaced apart rows of fins formed on each of said generally planar regions, each row oriented in an axial direction parallel to the longitudinal axis of said shank portion, each of said rows of fins disposed so as to form gaps between vertically adjacent fins such that a first fin in a first row intersects the shank in a plane different than each fin of a second row such that the fins in the first row project in a direction normal to the axis to be entirely within said gaps created by the fins in the second row;

a bow member disposed on the shank a predetermined distance between the head portion and the fins having a centermost portion and flexible distal ends that arch away from the head portion a predetermined distance greater than the centermost portion;

wherein the regions circumferentially alternate between a region of rows of fins and an exposed shank region; and wherein each of the rows of flexible fins are angled toward the head portion an equal predetermined degree.

10. The push pin as claimed in claim 9, wherein the shank is H-shaped in cross section.

* * * * *